(12) United States Patent  
Tsuchiya

(10) Patent No.: US 9,039,587 B2  
(45) Date of Patent: May 26, 2015

(54) MULTITASKING MACHINE TOOL

(71) Applicant: Okuma Corporation, Niwa-Gun (JP)

(72) Inventor: Masashi Tsuchiya, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 476 days.

(21) Appl. No.: 13/624,147

(22) Filed: Sep. 21, 2012

(65) Prior Publication Data

US 2013/0178347 A1    Jul. 11, 2013

(30) Foreign Application Priority Data

Jan. 11, 2012 (JP) .................. 2012-003322

(51) Int. Cl.
*B23Q 39/02* (2006.01)
*B23Q 3/155* (2006.01)
*B23Q 3/157* (2006.01)

(52) U.S. Cl.
CPC ....... *B23Q 3/15513* (2013.01); *Y10T 483/1733* (2015.01); *B23Q 3/1578* (2013.01); *Y10T 483/1745* (2015.01); *Y10T 483/1705* (2015.01); *Y10T 483/1714* (2015.01); *Y10T 483/1721* (2015.01); *B23Q 39/026* (2013.01); *B23Q 2230/002* (2013.01)

(58) Field of Classification Search
CPC .......... B23Q 3/15513; B23Q 3/15573; B23Q 3/15773; B23Q 3/1578; B23Q 2003/15586; Y10T 483/1702; Y10T 483/1705; Y10T 483/1714; Y10T 483/1719; Y10T 483/1721; Y10T 483/1724; Y10T 483/1745; Y10T 483/1748; Y10T 483/1752; Y10T 483/1757; Y10T 483/1767; Y10T 483/1769; Y10T 483/1771; Y10T 483/1776
USPC ........... 483/17, 18, 22, 24, 25, 26, 35, 36, 38, 483/40, 44, 45, 46, 48
See application file for complete search history.

(56) References Cited

U.S. PATENT DOCUMENTS

| | | | |
|---|---|---|---|
| 4,404,727 A * | 9/1983 | Zankl | 483/14 |
| 5,797,825 A * | 8/1998 | Murata et al. | 483/53 |
| 6,454,684 B2 * | 9/2002 | Kato | 483/41 |
| 2009/0116915 A1 * | 5/2009 | Kawasumi et al. | 408/146 |

FOREIGN PATENT DOCUMENTS

JP    58-160038 A1    9/1993

* cited by examiner

*Primary Examiner* — Erica E Cadugan  
*Assistant Examiner* — Michael Vitale  
(74) *Attorney, Agent, or Firm* — Burr & Brown, PLLC

(57) ABSTRACT

In a multitasking machine tool, a first tool post including a tool spindle configured to allow a tool to be detachably attached thereto is configured to be slidable in predetermined directions, while a second tool post is configured to allow a tool to be detachably attached thereto. A tool-change part includes at least one gripper configured to hold a tool to be attached to the second tool post. An automatic tool changer is configured to detachably attach the tool-change part (as well as to change the tool installed) to the tool spindle of the first tool post positioned in a first tool-change region. Change of the tool attached to the second tool post is carried out by a motion (sliding and/or rotation of the tool spindle) of the first tool post (with the tool-change part attached to the tool spindle thereof) located in a second tool-change region.

1 Claim, 6 Drawing Sheets

MULTITASKING MACHINE TOOL

BACKGROUND OF INVENTION

This application claims the benefit of Japanese Patent Application Number 2012-003322 filed on Jan. 11, 2012, the entirety of which is incorporated by reference.

TECHNICAL FIELD

This invention relates to a multitasking machine tool comprising a plurality of tool posts and an automatic tool changer configured to change a tool attached to one or more of the tool posts.

BACKGROUND ART

A conventionally known multitasking machine tool with a plurality of tool posts typically includes an automatic tool changer which comprises a tool magazine configured to store a variety of tools and a tool-changing arm configured to be rotatable on an axis extending in a predetermined direction, wherein a tool attached to a tool post is automatically changeable for any one of the tools stored in the tool magazine. Among prevailing multitasking machine tools of this type, the most common configuration may be such that a tool in a first tool post is changeable by the automatic tool changer while a second tool post is configured as a turret head having a polyhedral shape each side of which has a structure for holding one tool of a particular type different from that of a tool held at another side of the polyhedral turret head. The type of the tool to be used for machining by the second tool post is changeable by rotation (i.e., shift in the angular position) of the turret-head tool post. In this configuration, however, each time when one or more tools held in the second tool post need be replaced, the multitasking machine tool should be stopped for such replacement. Thus, the operation of the multitasking machine tool cannot be continued for a long period of time without making a stop.

With this in view, a multitasking machine tool proposed in Japanese Patent Application Publication No. 58-160038 (JP 58-160038 A) is configured to comprise an automatic tool changer which includes a tool magazine and a tool-changing arm. The automatic tool changer is configured to be movable in predetermined directions so that the automatic tool changer can be used to change any of the tools attached to the first tool post and the second tool post.

The multitasking machine tool of this type such as disclosed in JP 58-160038 A would be disadvantageous in that the movable feature of the automatic tool changer would require a large-scale mechanism, causing an increase in the cost of the machine tool. Accordingly, the multitasking machine toot in entirety would be larger in size, and would thus require a larger space occupied in its installation site.

There is a need to provide an improved multitasking machine tool with advantageous features by which tools attached to a plurality of tool posts can be changed without stopping the operation of the machine tool and which can be achieved without significant increase in the size and the manufacturing cost of the machine tool.

The present invention has been made in an attempt to eliminate the above disadvantages, and illustrative, non-limiting embodiments of the present invention may overcome the above disadvantages and other disadvantages not described above.

SUMMARY OF INVENTION

In one aspect, a multitasking machine tool is provided which comprises a first tool post, a second tool post, a tool-change part, and an automatic tool changer. The first tool post includes a tool spindle configured to allow a tool to be detachably attached thereto. The first tool post is configured to be slidable in predetermined directions, and movable to a first tool-change region in which the tool attached to the tool spindle of the first tool post is changeable into another tool and to a second tool-change region. The second tool post is configured to allow a tool to be detachably attached thereto independently of attachment and detachment of the tool to and from the tool spindle of the first tool post. The tool-change part includes at least one gripper configured to hold a tool to be attached to the second tool post. The automatic tool changer is configured to change the tool attached to the tool spindle of the first tool post positioned in the first tool-change region, and to detachably attach the tool-change part to the tool spindle of the first tool post positioned in the first tool-change region. Change of the tool attached to the second tool post into another tool is carried out by a motion of the first tool post located in the second tool-change region with the tool-change part attached to the tool spindle of the first tool post, which motion includes sliding of the first tool post and/or rotation of the tool spindle of the first tool post.

In this configuration, the tool-change part including at least one gripper configured to hold a tool to be attached to the second tool post can be attached to the tool spindle of the first tool post by the automatic tool changer. The tool attached to the second tool post is changed (the attached tool is detached therefrom and a new tool is attached thereto) by the motion of the first tool post (with the tool-change part attached to the tool spindle) located in the second tool change region. To be more specific, the first tool post with the tool-change part attached to the tool spindle thereof is slid (making a translational motion) and/or the tool spindle to which the tool-change part is attached is rotated. Accordingly, change of the tool attached to the second tool post can be carried out automatically without stopping the multitasking machine tool and without moving the automatic tool changer to a position in which the tool attached to the second tool post can be changed by the automatic tool changer. As a result, miniaturization and manufacturing cost reduction of the multitasking machine tool can be achieved.

BRIEF DESCRIPTION OF DRAWINGS

The above aspect, other advantages and further features of the present invention will become more apparent by describing in detail illustrative, non-limiting embodiments thereof with reference to the accompanying drawings.

DESCRIPTION OF EMBODIMENTS

An illustrative, non-limiting embodiment of the present invention will be described hereinafter with reference to the accompanying drawings.

Figure 1:
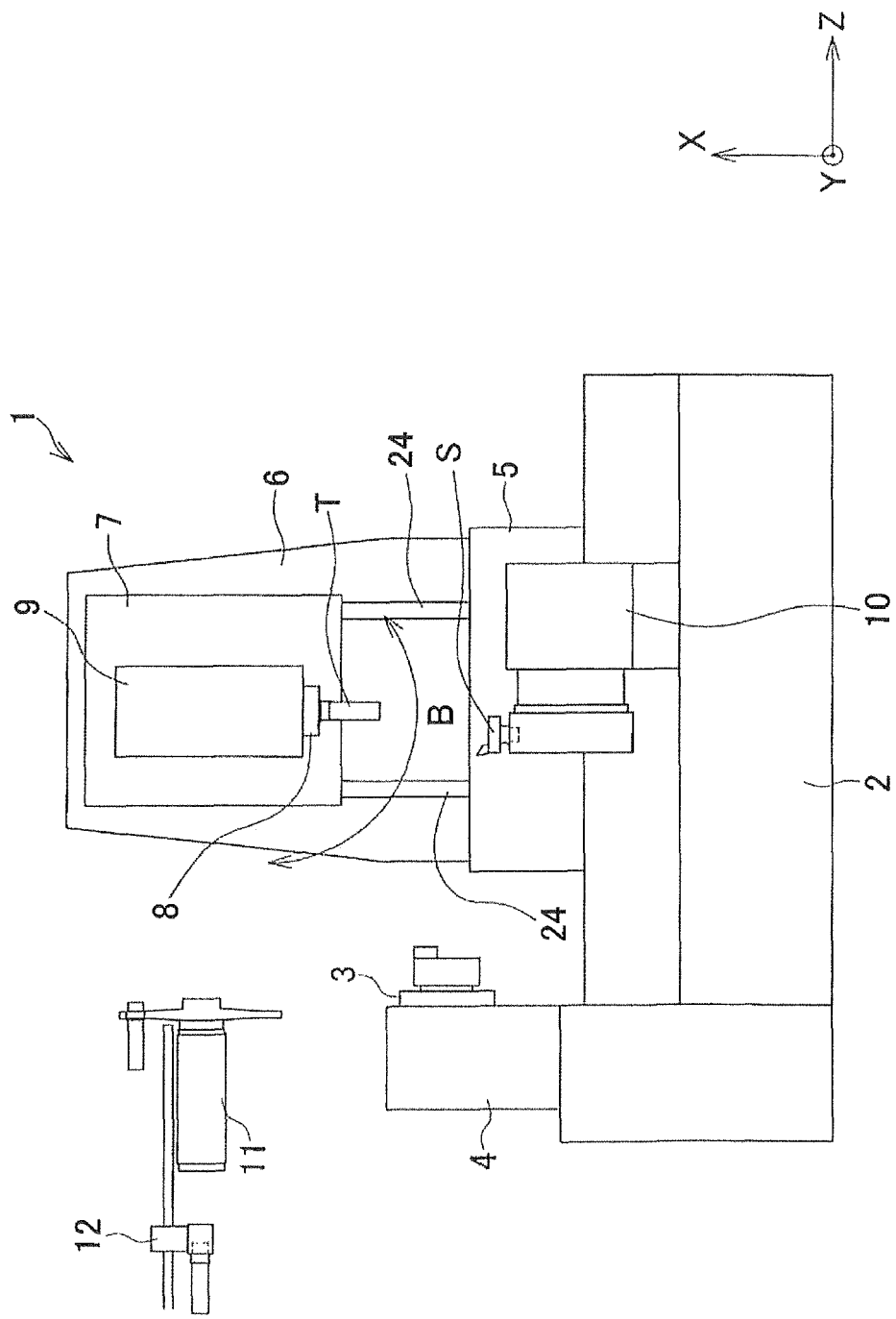
FIG. 1 is a schematic diagram of a multitasking machine tool as viewed from the front.
Figure 2:
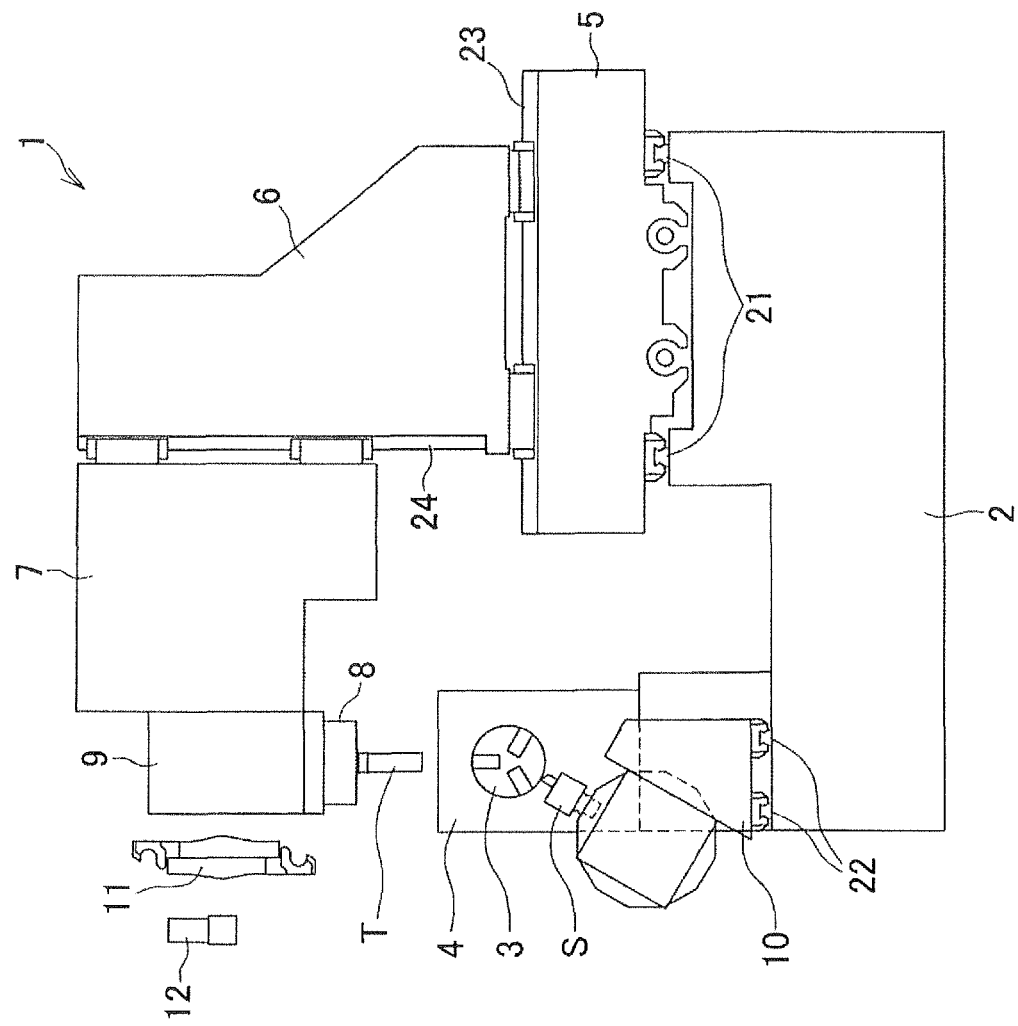
FIG. 2 is a schematic diagram of the multitasking machine tool as viewed from the right.

First, referring to FIGS. 1 and 2, a general structure of a multitasking machine tool 1 will be described. X axis, Y axis, and Z axis are three axes orthogonal to one another. In FIG. 1, the X axis extends in the upward-and-downward direction, the Y axis extends in the frontward-and-rearward direction, and the Z axis extends in the leftward-and-rightward direction.

The multitasking machine tool 1 comprises two tool posts, a first tool post 9 and a second tool post 10. The first tool post 9 is configured to allow a rotary tool to be attached thereto. The second tool post 10 is configured to allow a tool to be attached thereto, and the type of the tool to be attached to the second tool post 10 is different from that of the tool to be attached to the first tool post 9. The tool can be detachably attached to the second tool post 10 independently of the attachment and detachment of the tool to and from the first tool post 9. A headstock 4 is provided on a bed 2 as a pedestal. The headstock 4 includes a main spindle 3 configured to rotate on an axis extending in the leftward-and-rightward direction. On an upper surface of the bed 2, a Z-axis guide 21 which extends in a Z-axis direction is provided in a position closer to the rear side, and another Z-axis guide 22 which extends in the Z-axis direction is provided in a position closer to the front side.

A saddle 5 is disposed on the Z-axis guide 21 and configured to be movable in the Z-axis direction. On an upper surface of the saddle 5, a Y-axis guide 23 which extends in a Y-axis direction is provided. A column 6 is disposed on the Y-axis guide 23 and configured to be movable in the Y-axis direction. On a front surface of the column 6, an X-axis guide 24 which extends in an X-axis direction is provided. A carriage 7 is disposed on the front surface of the column 6, and configured to be movable in the X-axis direction along the X-axis guide 24. On a front surface of the carriage 7, the first tool post 9 is disposed and configured to be rotatable on an axis (B axis) extending in the frontward-and-rearward direction. In this way, the first tool post 9 is configured to be movable (slidable) in the X-axis, Y-axis and Z-axis directions by means of the saddle 5, the column 6 and the carriage 7. The first tool post 9 includes a tool spindle 8 which is configured to be rotatable on an axis extending in the upward-and-downward direction when the first tool post 9 is indexed by being rotated on the B axis to an angular position of 90 degrees relative to the horizontal as shown in FIG. 1. The tool spindle 8 is configured to allow a tool T to be detachably attached thereto. The tool T to be attached to the tool spindle 8 is of a type (i.e., rotary tool) such that the tool T is rotated when it is used for machining operation.

The second tool post 10 is disposed on the Z-axis guide 22 and configured to be movable in the Z-axis direction. The second tool post 10 is configured to allow a tool S to be detachably attached thereto. The tool S to be attached to the second tool post 10 is of a type different from the rotary tool T. The second tool post 10 includes, in its inside, an indexing mechanism (not shown) configured to index the tool S to change its position in the X-axis direction. Accordingly, the second tool post 10 is configured to be movable in the X-axis and Z-axis directions. In the present embodiment, the second tool post 10 is disposed below the first tool post 9.

An automatic tool changer is disposed in a position leftward of the first tool post 9, the carriage 7 and the column 6. The automatic tool changer includes a tool-changing arm 11, a tool magazine (not shown), and a conveyor 12. The tool-changing arm 11 is configured to be rotatable on an axis extending in the leftward-and-rightward direction. The tool magazine is configured to store tools of various types. The conveyor 12 is configured to convey tools between the tool-changing arm 11 and the tool magazine. The tool-changing arm 11 is disposed above the headstock 4. The tool-changing arm 11 is a known device which includes a pair of arm portions protruding from the center radially in opposite directions.

The multitasking machine tool 1 as described above is configured to cause a workpiece (not shown) supported by the headstock 4 to be machined on by the first tool post 9 moving in the X-axis, Y-axis and Z-axis directions and rotating on the B axis, and by the second tool post 10 moving in the X-axis and Z-axis directions, under the control of an NC device (controller, not shown). In addition to the operations of the first and second tool posts 9, 10, various other operations, such as the rotational operation of the headstock 4, the rotational operation of the tool T attached to the first tool post 9, and the tool-changing operation for a tool attached to each tool post 9, 10 which will be described later, are carried out under the control of the NC device.

Figure 3:
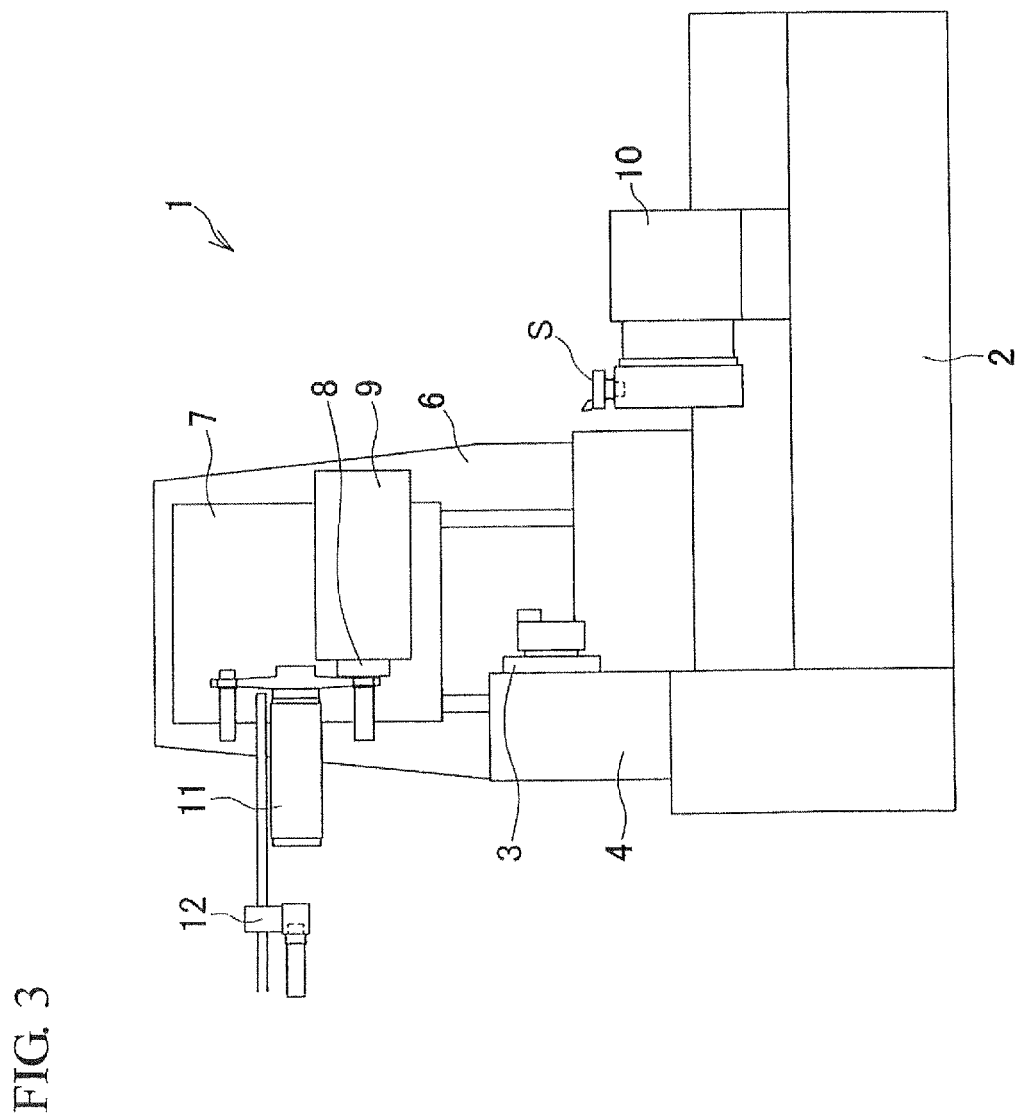
FIG. 3 is a schematic diagram for illustrating the change of a tool attached to a First tool post.
Figure 4:
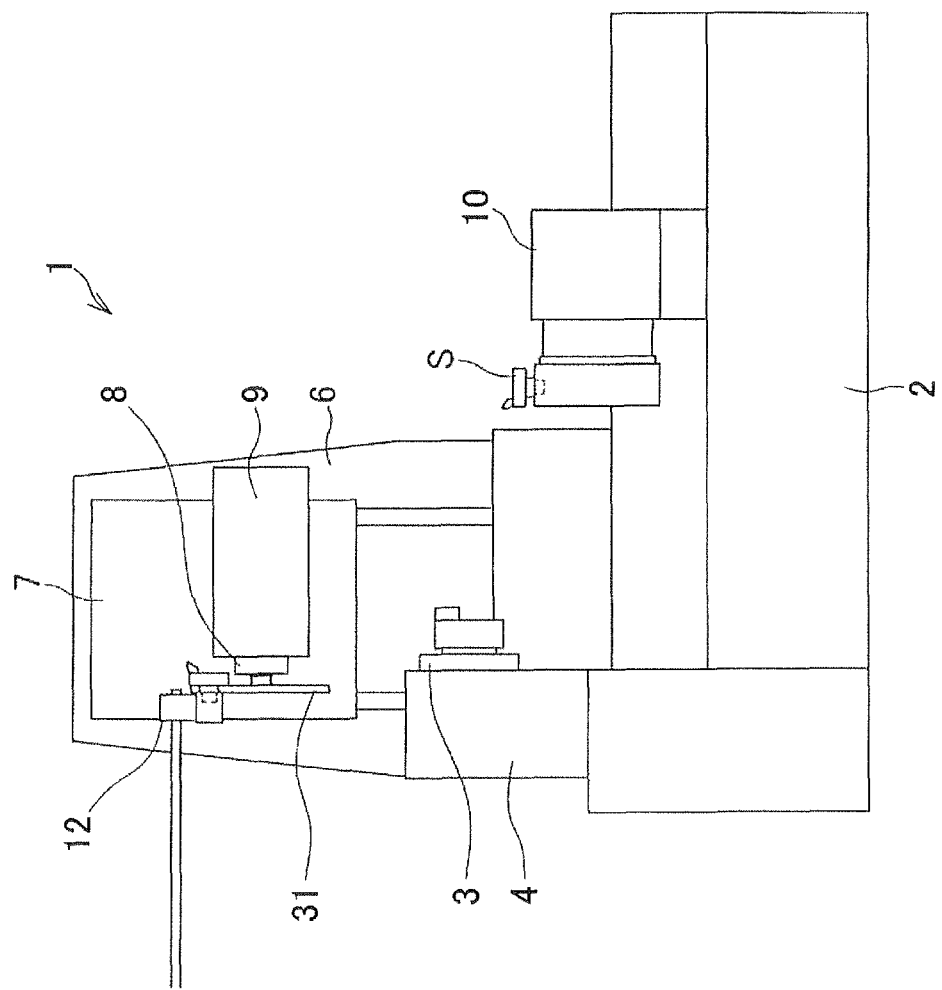
FIG. 4 is a schematic diagram for illustrating the change of a tool attached to a second tool post.
Figure 5:
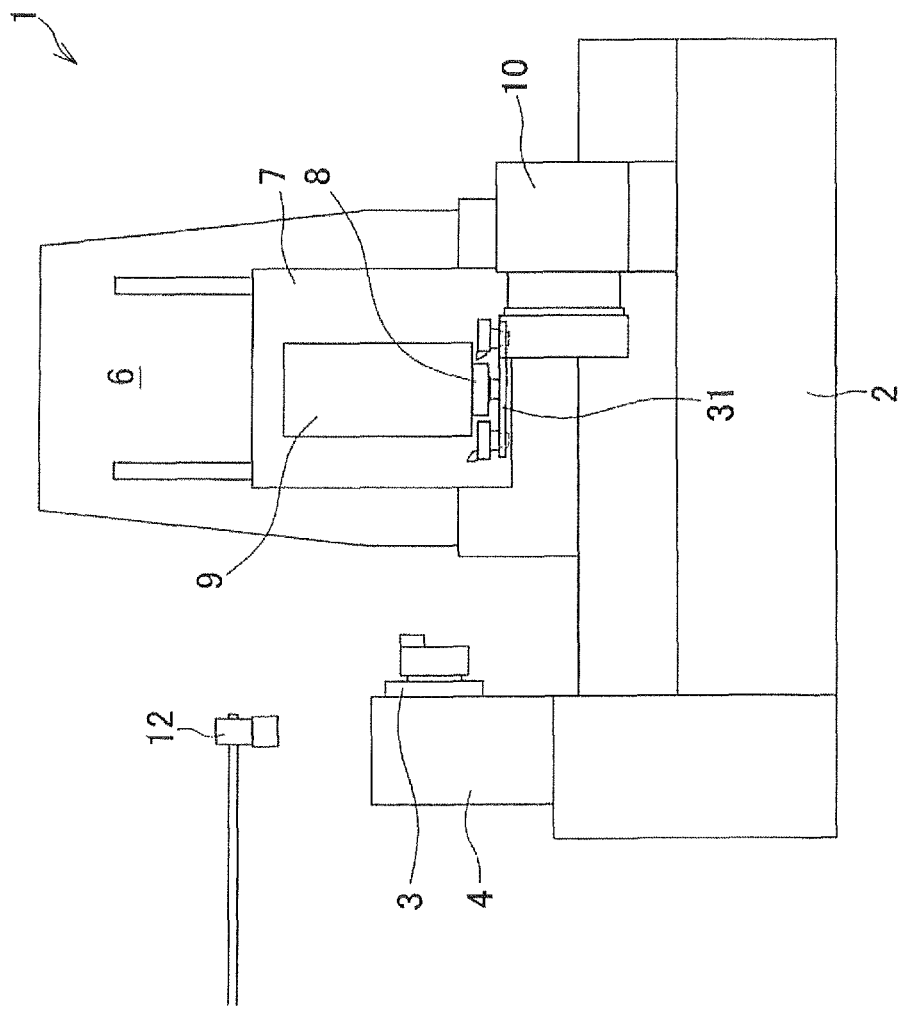
FIG. 5 is a schematic diagram for illustrating the change of a tool attached to the second tool post.

To illustrate the unique features of the present embodiment, a specific configuration for the tool-changing operations for the first tool post 9 and the second tool post 10 will now be described with reference to FIGS. 3-6. FIG. 3 shows an operation of changing a tool attached to the first tool post 9. FIGS. 4 and 5 show an operation of changing a tool attached to the second tool post 10. FIGS. 6A-6D show a variety of tool-change parts 31, 41, 51 and 61 for use in changing a tool attached to the second tool post 10. It should be noted that illustration of the tool-changing arm 11 in FIGS. 4 and 5 is omitted for the sake of simplicity.

In order to change a tool for the first tool post 9, first, a new tool to be attached to the tool spindle 8 is provided and caused to be held at one of the arm portions of the tool-changing arm 11. Then, the first tool post 9 is indexed (caused to rotate on the B axis) to a position at an angle of 0 degrees as shown in FIG. 3, and at the same time, the first tool post 9 is operated to move in the X-axis, Y-axis and/or Z-axis directions so that the tool currently attached to the tool spindle 8 is positioned on a path of movement of the end portions of the arm portions being made as the tool-changing arm 11 is rotated. Thereafter, the tool-changing arm 11 is rotated to cause the end portion of the other of the arm portions (with no tool held thereat) to hold the tool attached to the tool spindle 8. The first tool post 9 is again operated for example to move in the Z-axis direction so as to remove the tool from the tool spindle 8, and then the tool-changing arm 11 is rotated and given a 180-degree turn so that the new tool held at the end portion of the one of the arm portions is positioned on the left of the first tool post 9. Then, the first tool post 9 is again operated to move for example in the Z-axis direction so as to attach the tool to the tool spindle 8, and the tool-changing arm 11 is rotated and given a 90-degree turn to release (move away from) the tool. Consequently, the tool changing operation for the first tool post 9 is completed. In this operation, a region in which a tool attached to the first tool post 9 is changeable into another tool by the automatic tool changer will be referred to as a first tool-change region.

Figure 6A:
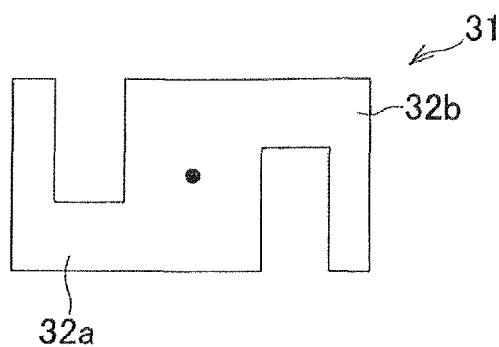
FIGS. 6A-6D are schematic diagrams showing a variety of tool-change parts for use in changing a tool attached to the second tool post.

On the other hand, in order to change a tool for the second tool post 10, first, a tool-change part 31 as shown in FIG. 6A is caused to be held at one of the arm portions of the tool-changing arm 11. The tool-change part 31 includes a shank portion (not shown) extending in a frontward-and-backward direction in FIG. 6, and a pair of grippers 32a, 32b provided at the front end of the shank portion and protruding therefrom radially in opposite directions. Each gripper 32a, 32b has a holding portion which opens in a direction of rotation of the tool-change part 31 rotatable on an axis of the shank portion. The holding portion of the gripper 32a and the holding portion of the gripper 32b have shapes rotationally symmetric to each other with respect to the axis of rotation of the tool-change part 31 (the axis of the shank portion thereof).

In this operation, the tool-change part 31 held by the tool-changing arm 11 till that time is temporarily attached to the first tool post 9 in the first tool-change region by following the same operation as performed in changing a tool attached to the first tool post 9 as described above. The conveyor 12 is then actuated to cause a new tool to be held by one of the grippers (e.g., gripper 32a) of the tool-change part 31 attached to the first tool post 9 as shown in FIG. 4. Thereafter, the first tool post 9 to which the tool-change part 31 is attached is indexed (caused to rotate on the B axis) to a position at an angle of 90 degrees. Further, the first tool post 9 is operated to move in the X-axis, Y-axis and Z-axis directions to a second tool-change region, which refers to a region where a tool attached to the second tool post 10 is to be changed for a new one (to be more specific, when the first tool post 9 is moved to the second tool-change region, the grippers 32a, 32b come to a position in which a tool attached to the second tool post 10 located in a predetermined tool-exchange position can be held at either of the grippers 32a, 32b by rotating the tool spindle 8 of the first tool post 9). At the same time, the second tool post 10 is operated to move in the X-axis and Z-axis directions to the tool-exchange position for exchanging the tool between the second tool post 10 and the first tool post 9.

Thereafter, the tool spindle 8 of the first tool post 9 in the second tool-change region is rotated so that the gripper 32b at which the tool is not held is caused to hold the tool which is attached to the second tool post 10 and ready to be replaced with a new one. Subsequently, for example, the first tool post 9 is operated to move in the X-axis direction (e.g. upward) to remove the tool from the second tool post 10. Then, after the tool spindle 8 is rotated and given a 180-degree turn, the first tool post 9 is moved in the X-axis direction again but oppositely (e.g., downward) so that the new tool held at the gripper 32a is fitted into and attached to the second tool post 10 as shown in FIG. 5. Finally, the tool spindle 8 is rotated and given a 90-degree turn to move the grippers 32a, 32b to positions in which the both of the grippers 32a, 32b are away from the second tool post 10. In this way, the tool changing operation for the second tool post 10 is completed. When the tool-changing operation for the second tool post 10 is completed in a way as described above, the aforementioned procedural steps are reversely taken. That is, the tool having been attached to the second tool post 10 is removed from the tool-change part 31 by the conveyor 12, then the tool-change part 31 is removed from the tool spindle 8 of the first tool post 9 and a desired tool is attached to the tool spindle 8 by following the same operation as that which is performed in changing a tool attached to the first tool post 9 with a new one.

In the multitasking machine tool 1 configured as described above, the first tool post 9 includes the tool spindle 8 configured to allow a tool to be detachably attached thereto. The first tool post 9 is configured to be slidable in the X-axis, Y-axis and Z-axis directions, and movable to the first tool-change region in which the tool attached to the tool spindle 8 of the first tool post 9 is changeable into another tool and to a second tool-change region. The second tool post 10 is configured to allow a tool to be detachably attached thereto independently of attachment and detachment of the tool to and from the tool spindle 8 of the first tool post 9. The tool-change part 31 includes the grippers 32a, 32b configured to hold a tool to be attached to the second tool post 10. The automatic tool changer is configured to change the tool attached to the tool spindle 8 of the first tool post 9 positioned in the first tool-change region, and to detachably attach the tool-change part 31 to the tool spindle 8 of the first tool post 9 positioned in the first tool-change region. Change of the tool attached to the second tool post 10 into another tool is carried out by a motion of the first tool post 9 located in the second tool-change region with the tool-change part 31 attached to the tool spindle 8 of the first tool post 9, which motion includes sliding of the first tool post 9 and/or rotation of the tool spindle 8 of the first tool post 9. Accordingly, change of the tool attached to the second tool post 10 can be carried out automatically without stopping the multitasking machine tool 1 and without moving the automatic tool changer to a position in which the tool attached to the second tool post 10 can be changed by the automatic tool changer. As a result, miniaturization and manufacturing cost reduction of the multitasking machine tool 1 can be achieved.

Furthermore, since the tool-change part 31 includes a pair of grippers 32a, 32b provided at the front end of the shank portion extending in the frontward-and-rearward direction which grippers 32a, 32b extend from the shank portion radially in opposite directions. Each gripper 32a, 32b has a holding portion which opens in a direction of rotation of the tool-change part 31 rotatable on an axis of the shank portion. In this configuration, a tool attached to the second tool post 10 can be changed for a new one by the motion of sliding of the first tool post 9 and the second tool post 10 in the predetermined directions (X-axis, Y-axis and/or Z-axis directions), and the rotation of the tool spindle 8 of the first tool post 9. In this way, no special motion of the first tool post 9 and the second tool post 10 is required for change of the tools, and thus the illustrated aspects of the present invention can be achieved in the existing equipment and easy to realize.

The configurations of the multitasking machine tool consistent with the present invention are not limited to the illustrated embodiments described above, but it is to be understood that various modifications and changes may be made, without departing from the scope of the present invention where appropriate, to the specific configurations, for example, the general setup of the multitasking machine tool, the structural features of the tool-change part, the configurations related to the change of tools, and other features.

Figure 6B:
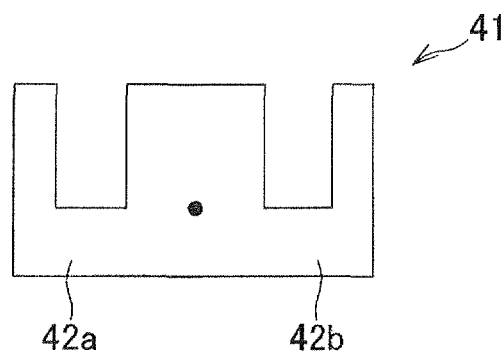
Figure 6C:
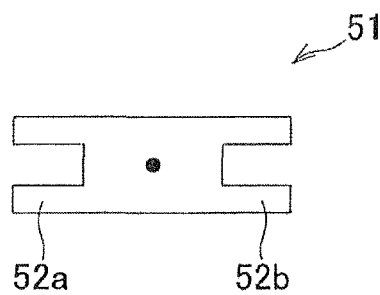

For example, as an alternative of the tool-change part 31 configured in accordance with the exemplary embodiment described above, other tool-change parts 41, 51 as illustrated in FIGS. 6B and 6C may be adopted as the tool-change part consistent with the present invention.

The tool-change part 41, similar to the tool-change part 31, includes a shank portion (not shown) extending in the frontward-and-backward direction in FIG. 6, and a pair of grippers 42a, 42b provided at the front end of the shank portion and protruding therefrom radially in opposite directions. Each gripper 42a, 42b has a holding portion which opens in a direction (upward direction in FIG. 6B) perpendicular to the direction of the axis of the shank portion and to the direction of protrusion of the grippers 42a, 42b. Therefore, when the tool attached to the second tool post 10 is changed by using the tool-change part 41, the tool attached to the second tool post 10 is caused to be held at the grippers 42a, 42b or released therefrom, not by rotating the tool spindle 8 but by causing the first tool post 9 to move in the direction of the opening of the holding portions of the grippers 42a, 42b. Furthermore, when the positions of two tools attached to the tool-change part 41 (after receiving a tool from the second tool post 10 before attaching a new tool to the second tool post 10) are interchanged above the second tool post 10 for replacement, the operation to be performed is not the rotation of the tool spindle 8 but the translation of the first tool post 9 in the direction of protrusion of the grippers 42a, 42b. To be more specific, after the tool-change part 41 is attached to the tool spindle 8, the first tool post 9 is caused to rotate on the B axis, and the tool spindle 8 is rotated so that the tool-change part 41 is positioned for example with the direction of opening of the holding portions angled in the Y-axis direction. The thus-angled first tool post 9 is moved (translated) to the second tool-change region. Thereafter, the to-be-replaced tool attached to the second tool post 10 located in the tool-exchange position is caused to be held at either of the grippers (e.g., the gripper 42b at which no tool is held). After the tool is removed from the second tool post 10 for example by moving the first tool post 9 in the X-axis direction (upward), the first tool post 9 is moved for example in the Z-axis direction (rightward). Then, the first tool post 9 is moved for example in the X-axis direction (downward) whereby a new tool held at the gripper 42a is fitted into, and attached to, the second tool post 10. Subsequently, the first tool post 9 is again moved in the Y-axis direction (rearward) to go away from the second tool post 10. In this way, the tool-changing operation for the second tool post 10 is completed.

The tool-change part 51 also, similar to the tool-change part 31, includes a shank portion (not shown) extending in the frontward-and-backward direction in FIG. 6, and a pair of grippers 52a, 52b provided at the front end of the shank portion and protruding therefrom radially in opposite directions. Each gripper 52a, 52b has a holding portion which opens in the direction of protrusion of the gripper 52a, 52b (leftward-and-rightward direction). Therefore, when the tool attached to the second tool post 10 is changed by using the tool-change part 51, the tool attached to the second tool post 10 is caused to be held at the grippers 52a, 52b or released therefrom by causing the first tool post 9 to move in the direction of the opening of the holding portions of the grippers 52a, 52b. The positions of two tools attached to the tool-change part 51 are interchanged above the second tool post 10 for replacement by the rotation of the tool spindle 8. To be more specific, after the tool-change part 51 is attached to the tool spindle 8, the first tool post 9 is caused to rotate on the B axis, and the tool spindle 8 is rotated so that the tool-change part 51 is positioned for example with the direction of opening of the holding portions angled in the Z-axis direction. The thus-angled first tool post 9 is moved (translated) to the second tool-change region. Thereafter, by moving the first tool post 9 in the Z-axis direction, the to-be-replaced tool attached to the second tool post 10 is caused to be held at either of the grippers (e.g., the gripper 52b at which no tool is held). After the tool is removed from the second tool post 10 for example by moving the first tool post 9 in the X-axis direction (upward), the tool spindle 8 is rotated and given a 180-degree turn. Then, the first tool post 9 is again operated to move in the X-axis direction (downward), for example, whereby a new tool held at the gripper 52a is fitted into, and attached to, the second tool post 10. Subsequently, the first tool post 9 is moved in the Z-axis direction away from the second tool post 10. In this way, the tool-changing operation for the second tool post 10 is completed.

Figure 6D:
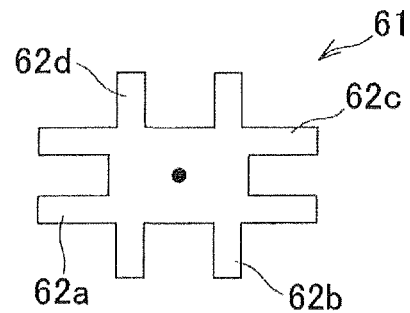

In the above-described embodiment and its alternatives, only two grippers are provided in each tool-change part. However, for example, as shown in FIG. 6D, three or more grippers (a four-gripper configuration is illustrated herein) 62a-62d may be provided in a single tool-change part 61.

On the contrary, a tool-change part including only one gripper may be adopted, instead. In this configuration, the tool-changing operation for the second tool post 10 may be performed as described below. After the tool is removed from the second tool post 10, the first tool post 9 is caused to return to a position where the automatic tool changer operates, and tools are exchanged between the automatic tool changer and the first tool post 9. Thereafter, the first tool post 9 is caused to go back to a position near the second tool post, and a new tool is attached to the second tool post 10.

Furthermore, a third tool post may be provided in the multitasking power tool. The second tool post 10 may be configured as a turret head having a polyhedral shape each side of which has a structure for holding one tool of a particular type different from that of a tool held at another side of the polyhedral turret head. Furthermore, the second tool-change region, as well as the tool-exchange position, may be configured as a predetermined region located at a fixed position in the multitasking power tool. On the other hand, the second tool-change region may be configured as a region to be determined each time when the tool change operation is necessitated, based on the position of the second tool post 10 at that time. In addition, the multitasking power tool may be configured such that not only the first tool post 9 but also the second tool post 10 is caused to move when the tool is removed from or fitted into the second tool post 10.

The invention claimed is:
1. A multitasking machine tool comprising:
a first tool post including a tool spindle configured to allow a first tool to be detachably attached thereto, the first tool post being configured to be slidable in predetermined directions, and movable to both a first tool-change region in which the first tool attached to the tool spindle of the first tool post is exchangeable with another tool, and to a second tool-change region;
a second tool post configured to allow a second tool to be detachably attached thereto;
a tool-change part including an arm that includes a shank portion and at least two grippers, with a first of the grippers being on one end of the arm and a second of the grippers being at the other end of the arm, wherein the first gripper is configured to receive the second tool that is to be removed from the second tool post, and the second gripper is configured to hold a replacement tool that is to be attached to the second tool post; and
an automatic tool changer configured to change the first tool attached to the tool spindle of the first tool post positioned in the first tool-change region, and to detachably attach the tool-change part to the tool spindle of the first tool post positioned in the first tool-change region,
wherein exchange of the second tool attached to the second tool post with the replacement tool is carried out by a motion of the first tool post located in the second tool-change region with the shank portion of the tool-change part attached to the tool spindle of the first tool post, which motion includes at least one of sliding of the first tool post and rotation of the tool spindle of the first tool post such that the first gripper receives the second tool and the replacement tool is subsequently removed from the second gripper and inserted into the second tool post.

* * * * *